UNITED STATES PATENT OFFICE.

JOHN C. OLSEN, OF BROOKLYN, NEW YORK, ASSIGNOR TO CHESTER NOVELTY COMPANY, INCORPORATED, OF ALBANY, NEW YORK, A CORPORATION OF NEW YORK.

INK-STICK.

1,364,406.     Specification of Letters Patent.     Patented Jan. 4, 1921.

No Drawing.     Application filed April 24, 1920. Serial No. 376,274.

*To all whom it may concern:*

Be it known that I, JOHN C. OLSEN, a citizen of the United States of America, residing at the borough of Brooklyn, city of New York, in the county of Kings and State of New York, have invented certain new and useful Improvements in Ink-Sticks, of which the following is a specification.

This invention relates to improvements in inks and particularly to improvements to inks adapted and designed to be used in the solid state and more especially in the form of a stick (whence the name, ink-stick) which, when attached to a common pen and moistened (as with water, a watery fluid, or the like), will dissolve and produce a flow of liquid ink for use by the pen; and an object of this invention is to provide a solid ink usable in the form of an ink-stick and having strength without brittleness so that the ink-stick may, without breakage and resulting waste, annoyance and inconvenience, be attached to and held in the pen by means of a suitable clip or like device commonly provided for such a purpose. Another object of this invention is to provide an ink-stick having the right degree of solubility so that it will, when moistened, supply to the pen a flow of ink that will be neither too great nor too slight but will be just sufficient to enable the user to write freely and easily. A third object of this invention is to provide an ink-stick which, after using, will dry speedily and cease to dissolve and will retain its solid form without loss of strength, whereby the ink-stick will prove economical in use and durable, being capable of use over and over again, until the very last of it has been made use of. Other features of this invention will be pointed out hereinafter.

In the ink-stick herein described, the ink-forming constituents proper (*e. g.*, an anilin dye of any desired color and iron tannate) are combined with a water-insoluble substance (*e. g.*, graphite suitably comminuted) to give permance of form and hardness with strength, and a suitable adhesive or binder (*e. g.*, dextrin) which cements the other constituents into a solid mass that is soluble in the proper degree, as above set forth. The matter of proportions of the several constituents is not without much importance. Thus, if too much of the hardening element (graphite) is used, the ink-stick will not be readily soluble so as to provide, when moistened, a sufficiently copious flow of liquid ink to the pen. If the proportion of anilin dye used be unduly large, the ink-stick will be found to be brittle and easily breakable, with resulting waste and annoyance, so that the ink-stick will be cast aside as an impracticable thing. If an unduly large proportion of binder (dextrin) is used, the ink-stick, when moistened, will soften too rapidly and fail to retain its form, from which its use will be made too expensive in competition with other inks and the too free flow of liquid ink to the pen will militate against neatness and legibility of the writing.

The anilin dye used in the ink-stick is, of course, water-soluble; and, for a given quantity of such an anilin dye, say, four grams, the following weights of the other ingredients may be used to produce an ink-stick that has given entire satisfaction after continued use over a long period of time, viz.: Dextrin, about two (2) grams; graphite (powdered), about three (3) grams; and iron tannate, about sixty-eight milligrams. However, the amount of dextrin may be as small as one gram and as much as three grams, while the weight of powdered graphite used may vary from one to eight grams without departing from this invention. Moreover, the tannate of iron may be wholly dispensed with; when the same is used, it serves mainly the same purpose as it performs in ordinary writing fluids, that is, it causes the ink to be less fugitive than it otherwise might be and the writing to be more permanent and less likely to become yellowed by age and fade away (or fugitive). However, tannate of iron has, when used in substantial quantities (but not otherwise), a solidifying, hardening effect akin to that of the powdered graphite and, if desired, may be used as an equivalent thereof. But, since powdered graphite is cheaper than iron tannate, weight for weight, the use of powdered graphite is, of course, to be preferred. Kaolin powder may be used to replace, partially or wholly, powdered graphite and has been found to perform well as a substitute therefor and may be regarded as an equivalent for the graphite in giving the necessary solidity, strength and hardness to the ink-stick. Gums and other adhesives will suggest themselves to all skilled in this art as substitutes for dextrin as a binder; but, so far as the results of my experiments tend to disclose, dextrin serves best as a binder for the other ingredients of the ink-stick. I prefer to use graphite in a very finely comminuted form; such graphite not only remains in suspension in water freely and for a considerable length of time but also tends to produce an ink-stick that gives a writing that is uniform and of even depth. Moreover, the ink-stick will be more homogeneous in composition and more lasting in use. Ordinary commercial powdered graphite will, however, be found to contain a substantial proportion of coarsely-powdered graphite that will not pass, for example, through a so-called 30-mesh sieve (that is, a sieve having thirty wires to the linear inch); yet such ordinary commercial powdered graphite, being composed of particles of graphite of varying degrees of fineness, contains a large proportion of graphite of greater fineness of comminution than that just mentioned. Thus, there will be found a large percentage by weight of the graphite that will be so very finely comminuted as to pass freely through a 100-mesh sieve. Despite its content of coarsely-powdered graphite, ordinary commercial powdered graphite of the kind just described will nevertheless serve satisfactorily as an ink-stick ingredient and may be characterized as suitably comminuted for the purpose. However, the best results are to be obtained by the use of graphite so very finely powdered that all or nearly all of it will pass through a 100-mesh sieve and will remain freely suspended in water for a substantial length of time; such a finely-divided graphite, when used as an ingredient of the ink-stick composition hereinbefore described, will be found to lend uniformity and smoothness to the writing and to produce an ink-stick that will prove far more satisfactory to the user than one the graphite content of which is less finely powdered. An examination or test to determine the fineness of comminution of one of the powdered graphites used by me as a component of the ink-stick herein described gave the following results; viz., 00.10% was retained on a 36-mesh sieve;
00.21% was retained on a 60-mesh sieve;
95.00% was retained on an 80-mesh sieve;
4.55% was retained on a 100-mesh sieve;
and 00.14% passed through a 100-mesh sieve.

It will be understood that, in making this analysis, only that part of the graphite which passed through the 36-mesh sieve was tested in the 60-mesh sieve, only that part which passed the latter sieve was tested in the next finer sieve, and so on with the several sieves used. The percentage set out as having been retained in the case of any named sieve indicates that proportion of the whole mass tested which had passed through the coarser sieves mentioned and was retained by the sieve in question. The ink-stick made from the graphite of this grade or degree of fineness of comminution proved satisfactory in use, and graphite of this degree of fineness may be said to be suitably comminuted for the purpose hereinbefore set forth; but, as has been hereinbefore stated, such graphite would not, on account of its relative coarseness, be preferred by me. Graphite most of which will pass through a 100-mesh sieve and will remain freely suspended in water for a material period of time, is deemed by me to be better adapted for use as a constituent of the ink-stick composition than is graphite relatively so coarsely comminuted as was that the results of the analysis or examination of which have just been given hereinbefore. As a result of experiments made by me, I have determined that graphite so very finely comminuted as to pass through a 100-mesh sieve gives an ink-stick which is of excellent quality, one that possesses strength and produces a smooth, uniform writing; and that, as the graphite used was less finely comminuted than that just mentioned, the weaker was the resulting ink-stick and the more irregular was the writing gotten therewith. Classified on the basis of the fineness of comminution of the graphite used as an ingredient, the ink-sticks tested by me may be graded as to quality, as follows:

Using finely comminuted graphite that passed through an 80-mesh sieve but was retained on a 100-mesh sieve, the ink-stick was good.

Using finely comminuted graphite that passed through a 60-mesh sieve but was retained on an 80-mesh sieve, the ink-stick was fair.

Using graphite that passed through a 36-mesh sieve but was retained on a 60-mesh sieve, the ink-stick was passable.

Made from graphite that passed through a 20-mesh sieve but was retained on a 36-mesh sieve, the ink-stick was poor.

Graphite more coarsely comminuted than the specimen last described gave ink-sticks of even greater inferiority, the brittleness of such ink-sticks and the irregular or "grainy" character of the writing produced thereby increasing with the coarseness of comminution of the graphite.

As has already been hereinbefore stated in effect, the graphite and other solid material in the composition form a conglomerate, which is held together by the cementitious substance (e. g., dextrin) and, in a measure, by the soluble anilin dye-stuff. The following formula is illustrative of an ink-stick composition according to the present invention and containing only a small amount of the adhesive, dextrin, to-wit:

| | | |
|---|---|---|
| Dextrin | 1.0 | gram |
| Soluble anilin dye | 4.0 | grams |
| Comminuted graphite | 1.6 | grams |
| Tannate of iron | 0.068 | gram |

However, it is practicable to increase the weight of the dextrin used as compared with the other components and in accordance with the following formula, namely:

| | | |
|---|---|---|
| Dextrin | 3.0 | grams |
| Soluble anilin dye | 4.0 | grams |
| Comminuted graphite | 3.0 | grams |
| Tannate of iron | 0.068 | gram |

So, too, is it practicable to increase the percentage of comminuted graphite until the ink-stick composition contains the relatively large proportion shown by the following formula, that is to say:

| | | |
|---|---|---|
| Dextrin | 2.0 | grams |
| Soluble anilin dye | 4.0 | grams |
| Comminuted graphite | 8.0 | grams |
| Tannate of iron | 0.068 | gram |

But the material produced according to the immediately preceding formula proved to be a somewhat granular mass that was comparatively brittle, when dry, and was rather difficult to work. Without sacrificing in too great a degree the characteristics of strength, hardness and permanence of form of the composition, the content of comminuted graphite may be greatly reduced, however, from that just set forth hereinbefore, as is illustrated by the following formula, thus:

| | | |
|---|---|---|
| Dextrin | 2.0 | grams |
| Soluble anilin dye | 4.0 | grams |
| Comminuted graphite | 1.0 | gram |
| Tannate of iron | 0.068 | gram |

From all the illustrative compositions or formulæ hereinbefore set out, the tannate of iron may be wholly omitted without otherwise varying the formulæ.

The necessary constituents of the ink-stick composition according to the present invention are the following, viz.: (1) The water-soluble anilin dye; (2) the comminuted or pulverized insoluble material, such as graphite, or kaolin; and (3) an adhesive or binder, such as dextrin or a suitable gum. The dye, of course, gives the color, upon which the graphite, when the same is finely divided, will have an influence. The dye, moreover, has of itself an appreciable tendency to adhere to the graphite; but the dextrin is required to bind the graphite and the dye into a firm, solid mass. Were it not for the presence of the dextrin, the ink-stick would be brittle and incapable of being handled freely.

This application is filed as a continuation in part of my pending application, Serial No. 246131, filed July 22, 1918.

I claim:

1. A solid ink including in its composition a water-soluble anilin dye; finely comminuted graphite; and dextrin; said ink possessing hardness and strength without undue brittleness and being sufficiently soluble, when moistened, to provide a flow of liquid ink in volume enough to supply an ordinary pen and having the quality of drying rapidly and retaining its form, strength and hardness, after use, to substantially the initial degree.

2. A solid ink including in its composition a water-soluble anilin dye, finely comminuted graphite, and dextrin, in proportions substantially as specified; said ink possessing hardness and strength without undue brittleness and being sufficiently soluble, when moistened, to provide a flow of liquid ink in volume enough to supply an ordinary pen and having the quality of drying rapidly and retaining, after having been used, its form, strength and hardness in substantially the initial degree.

3. A solid ink including in its composition a water-soluble anilin dye, finely comminuted graphite in such quantity as to give hardness and strength without depriving the solid ink of the requisite solubility, and dextrin in such proportion as to give permanence of form without softness and excess of solubility; the proportion of the anilin dye being slight enough to prevent the solid ink from being too brittle for the purposes set forth.

In testimony whereof I hereunto set my hand at the borough of Brooklyn, city of New York, in the county of Kings and State of New York, this 23d day of April, A. D. 1920, in the presence of the two undersigned witnesses.

JOHN C. OLSEN.

Witnesses:
 H. P. SCHOENBERNER,
 HARRY C. VRULAND.